(12) United States Patent
Vera et al.

(10) Patent No.: US 8,074,110 B2
(45) Date of Patent: Dec. 6, 2011

(54) ENHANCING RELIABILITY OF A MANY-CORE PROCESSOR

(75) Inventors: Xavier Vera, Barcelona (ES); Osman Unsal, Barcelona (ES); Oguz Ergin, Ankara (TR); Jaume Abella, Barcelona (ES); Antonio González, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 12/224,108

(22) PCT Filed: Feb. 28, 2006

(86) PCT No.: PCT/ES2006/070021
§ 371 (c)(1),
(2), (4) Date: Aug. 18, 2008

(87) PCT Pub. No.: WO2007/099181
PCT Pub. Date: Sep. 7, 2007

(65) Prior Publication Data
US 2009/0094481 A1    Apr. 9, 2009

(51) Int. Cl.
*G06F 11/00* (2006.01)
(52) U.S. Cl. .......... 714/11; 714/25; 714/48; 714/49
(58) Field of Classification Search .......... 714/25, 714/48, 49
See application file for complete search history.

(56) References Cited

U.S. PATENT DOCUMENTS

| | | | | |
|---|---|---|---|---|
| 4,191,996 A | * | 3/1980 | Chesley | 714/30 |
| 4,519,035 A | * | 5/1985 | Chamberlain | 712/15 |
| 2002/0188877 A1 | * | 12/2002 | Buch | 713/320 |
| 2003/0067894 A1 | * | 4/2003 | Schmidt | 370/329 |
| 2003/0074598 A1 | * | 4/2003 | Bossen et al. | 714/6 |
| 2004/0037346 A1 | | 2/2004 | Rusu et al. | 374/121 |
| 2004/0123201 A1 | * | 6/2004 | Nguyen et al. | 714/736 |
| 2004/0230865 A1 | * | 11/2004 | Balazich et al. | 714/13 |
| 2005/0044319 A1 | * | 2/2005 | Olukotun | 711/118 |
| 2005/0050373 A1 | | 3/2005 | Orenstien et al. | |
| 2005/0102565 A1 | * | 5/2005 | Barr et al. | 714/25 |
| 2006/0053326 A1 | * | 3/2006 | Naveh et al. | 713/323 |
| 2006/0212677 A1 | * | 9/2006 | Fossum | 712/1 |

(Continued)

FOREIGN PATENT DOCUMENTS

JP    2004-062470    2/2004

(Continued)

OTHER PUBLICATIONS

Brooks, "Dynamic Thermal Managment for High-Performance Microprocessors", Jan. 2001, ISHPCA, p. 1-12.*

(Continued)

*Primary Examiner* — Robert Beausoliel, Jr.
*Assistant Examiner* — Jeison C Arcos
(74) *Attorney, Agent, or Firm* — Trop, Pruner & Hu, P.C.

(57) ABSTRACT

In one embodiment, the present invention includes a method for identifying available cores of a many-core processor, allocating a first subset of the cores to an enabled state and a second subset of the cores to a spare state, and storing information regarding the allocation in a storage. The allocation of cores to the enables state may be based on a temperature-aware algorithm, in certain embodiments. Other embodiments are described and claimed.

24 Claims, 6 Drawing Sheets

U.S. PATENT DOCUMENTS

| | | | | |
|---|---|---|---|---|
| 2007/0074011 | A1* | 3/2007 | Borkar et al. | 712/227 |
| 2007/0174746 | A1* | 7/2007 | Haefliger et al. | 714/721 |
| 2008/0148269 | A1* | 6/2008 | Wong et al. | 718/104 |
| 2009/0249094 | A1* | 10/2009 | Marshall et al. | 713/320 |

FOREIGN PATENT DOCUMENTS

| | | |
|---|---|---|
| JP | 200462470 | 2/2004 |
| JP | 2005-085164 | 3/2005 |
| JP | 200585164 | 3/2005 |
| JP | 2005-129053 | 5/2005 |
| JP | 2005129053 | 5/2005 |

OTHER PUBLICATIONS

Sharma, "Balance of Power: Dynamic Thermal Managment for Internet Data Centers", Feb. 18, 2003, HP, p. 1-14.*

Heo, "Reducing Power Density through Activity Migration", Aug. 2003, ISLPED, p. 1-6.*

Skadron, "Temperature-Aware Microarchitecure: Modeling and Implementation", Mar. 2004, ACM, p. 94-125.*

Chinese Patent Office, First Office Action mailed Oct. 23, 2009, in Chinese patent application No. 200680053450.0.

Japanese Patent Office, Notice of Reasons for Rejection dated Mar. 2, 2010, in Japanese patent application No. 2008-551806.

Kyriakos Stavrou, et al., "TSIC: Thermal Scheduling Simulator for Chip Multiprocessors," 2005, pp. 589-599.

PCT/ES2006/070021 International Search Report with Written Opinion of the International Searching Authority Mailed Feb. 28, 2006 (in Spanish).

Pedro Chapparro, et al., "Thermal-Aware Clustered Microarchitectures," 2004, pp. 1-6.

T. Simunic, et al., "Optimization of Reliability and Power Consumption in Systems on a Chip," 2005, pp. 1-10.

Japanese Patent Office, Final Notice of Reasons for Rejection dated Jul. 13, 2010, in Japanese patent application No. 2008-551806.

Japan Patent Office, Office Action for JP Application No. 2008-551806 (with English translation), dated Jul. 13, 2010, 5 pgs.

Chinese Patent Office, Second Office Action mailed May 11, 2011 in Chinese application No. 200680053450.0.

* cited by examiner

ENHANCING RELIABILITY OF A MANY-CORE PROCESSOR

This application is a United States national stage application under 35 U.S.C. §371 of PCT Application Serial No. PCT/ES2006/070021 filed Feb. 28, 2006, and is entitled to the international filing date of Feb. 28, 2006.

BACKGROUND

Embodiments of the present invention relate to multiprocessor systems, and more particularly to improving reliability in such multiprocessor systems.

Computer systems are becoming increasingly complex and are beginning to include advanced processors, including multicore processors. Dual-core processors having two processor cores that execute instructions concurrently have been introduced. It is anticipated that in the future, processors will be manufactured that include additional cores, e.g., more than two cores. Current road maps include processors with four and eight cores.

Additionally, long term it is anticipated that processors will evolve to a many-core environment, in which many cores are present in a single processor package, and even on a single substrate or die of the package. Accordingly, it is anticipated that processors with 8, 16, 32, 64, 128 or more cores will become available in the future. In addition to the complexity associated with such many-core processors, reliability concerns increase. Specifically, due to various technology-related issues, cores in a many-core processor will exhibit higher failure rates than single core or dual-core processors.

While various reasons exist for these greater failure rates, all of these reasons combine such that cores of a many-core processor may suffer from lifetimes that shorten from generation to generation. Such decreasing lifetimes can be attributed to a number of sources of degradation including electromigration, stress migration, time dependent dielectric breakdown (TDDB), negative bias temperature instability (NBTI), and thermal cycling. Most of these failure mechanisms are expressed at elevated temperatures, i.e., the higher the temperature, the lower the core mean time to failure (MTTF). The failure rate of the processor or a core thereof is commonly referred to as failures in time (FIT), which is the expected number of failures in $10^9$ hours. Using a FIT value, one can attain the MTTF as 1/FIT. For various technologies, MTTF is obtained assuming steady state operation at fixed conditions (e.g., temperature, voltage, frequency and utilization). Accordingly, increasing any of these parameters can cause further degradation of lifetime reliability.

DETAILED DESCRIPTION

Embodiments of the present invention may be used to improve reliability of semiconductor devices, and particularly processors including, for example, many-core processors. In different implementations, various schemes for allocating cores of a many-core processor for instruction execution may be realized. These allocation schemes may select cores for activation or enabling based on various operating parameters. One particular operating parameter that may be considered in selecting a core for activation is temperature. Because many semiconductor failure mechanisms are expressed at elevated temperatures, temperature thus has a direct bearing on core MTTF and many-core reliability. Thus embodiments of the present invention may implement core-granularity mechanisms to manage temperature to maximize many-core reliability. While maximizing such reliability, embodiments may further consider core degradation and process variations in allocating cores.

In addition to core allocation schemes, embodiments of the present invention may perform reallocation when, for example, a currently-enabled core suffers a failure or is otherwise unable to continue processing at a desired level of operation. In various embodiments, reallocation schemes may further take into consideration temperature-based analyses to select one or more cores of a set of available spare cores for use as active or enabled cores. Still further, embodiments of the present invention may further select cores for activation based on processing loads. For example, to improve performance of processes that communicate with each other, closely-coupled processes may be scheduled on cores in close relation to each other to minimize communication paths.

On a many-core processor, core temperatures can have a substantial lateral impact on neighboring cores. For example, if two neighboring cores are simultaneously on, their average temperatures will be higher compared to the case where they are separated by one or more spare cores. Spare cores (or failed cores) absorb heat generated by active cores, driving the temperatures on the active cores down. As an example, consider a 32-core many-core processor with 16 active and 16 spare cores. Utilizing an allocation/reallocation scheme in accordance with an embodiment of the present invention, drastically reduced core temperatures can be effected. For example, a checkerboard pattern (e.g., 1 online, 1 spare) can operate at a reduced temperature than equally-activated serial cores.

In this way, core reliability in a many-core environment may be improved, extending the lifetime of the many-core processor. Different embodiments may be implemented in different manners, depending on a desired architecture. In some embodiments, dedicated hardware may be used to select and control cores of a many-core processor. In other embodiments, a pure software-based approach may be implemented. Of course variations on pure hardware and software schemes may be taken in which some amount of dedicated hardware is used along with software to run on the dedicated hardware and/or other processing resources. For example, in some embodiments a microcontroller may be present to execute one or more algorithms that may be implemented in microcode of the controller. In other embodiments, algorithms may be implemented in software to execute on either a dedicated core of a multi-core processor, or on a selected core or portion thereof.

Allocation/reallocation schemes may be on a per-core basis (i.e., core granularity) that minimizes core failure rates, thus maximizing many-core reliability. In some implementations, a many-core processor may have a substantial number of cores kept as spares. In the case of a core failure, a spare core may be chosen from the available spares pool, and may be chosen so as to maximize the many-core reliability.

Most of the core failure mechanisms have a strong temperature dependency, and as a general rule the core failure rate increases at elevated temperatures. Thus core allocation/reallocation schemes that consider temperature may increase many-core processor reliability. In some embodiments, a many-core usage model that maximizes a sustained level of performance guaranteeing a target lifetime can be implemented. Similarly, the model can maximize the lifetime, guaranteeing a target level of performance. These models, which provide for initial core assignment and core reconfiguration upon a core failure or when a system cannot provide desired performance, take into consideration process variations and time-dependent frequency degradation. Further in some embodiments for applications in which different cores communicate, performance may be balanced with reliability.

Figure 1:
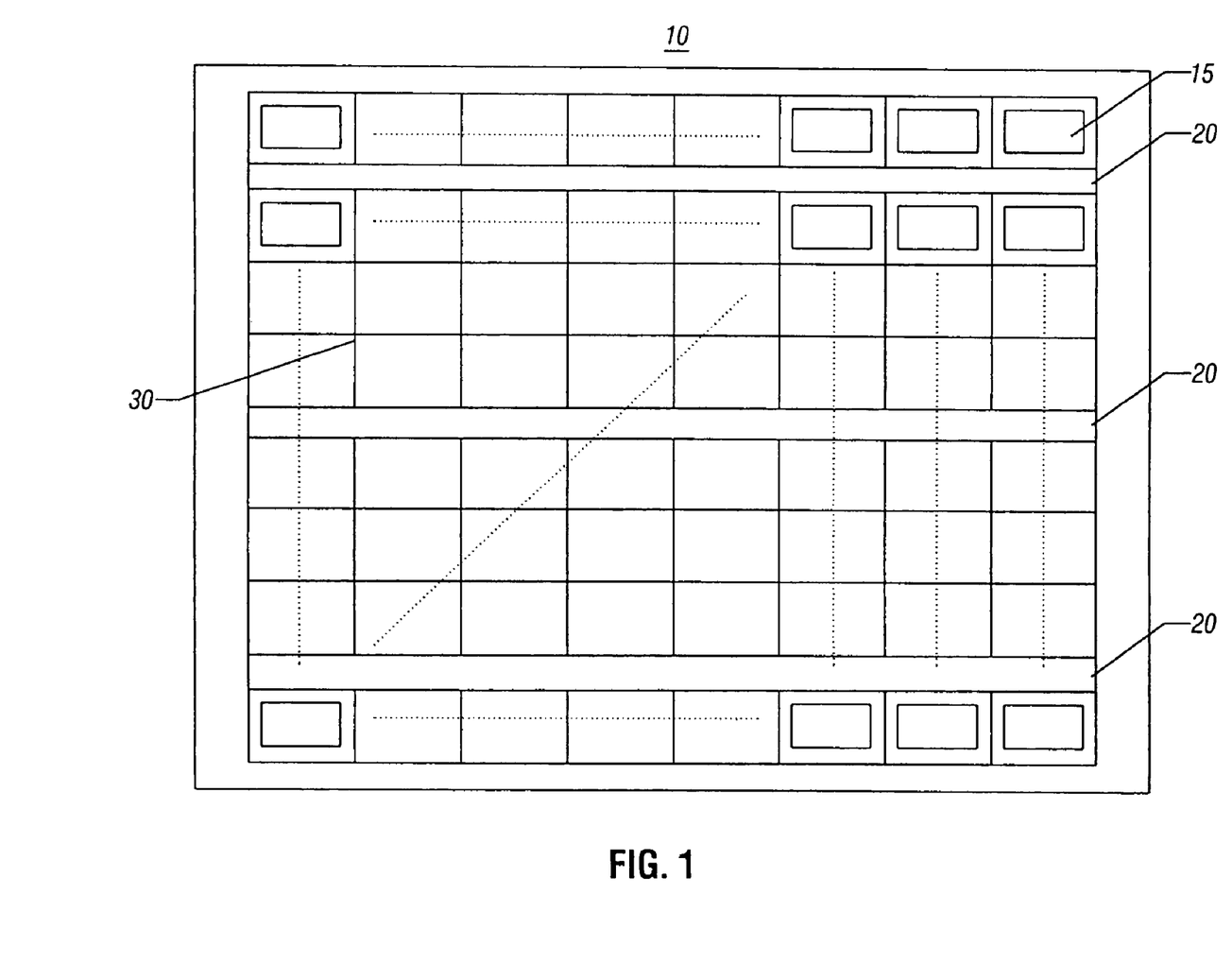
FIG. 1 is a block diagram of a many-core processor in accordance with one embodiment of the present invention.

Referring now to FIG. 1, shown is a block diagram of a many-core processor in accordance with one embodiment of the present invention. As shown in FIG. 1, processor 10 includes a plurality of individual cores 15. More specifically, the embodiment of FIG. 1 shows a configuration that includes an 8×8 array of cores coupled via an interconnect fabric 30. While shown with this particular implementation in the embodiment of FIG. 1, it is to be understood that the scope of the present invention is not so limited, and in other embodiments other configurations may be present, such as one-dimensional, two-dimensional or three-dimensional meshes or one-dimensional, two-dimensional, or three-dimensional torus configurations, for example. Further, while shown with 64 individual cores in the embodiment of FIG. 1, it is to be understood that many-core processors may include more or fewer such cores in different implementations.

Each core 15 may be a relatively small core, at least compared with single core or dual-core processors. In various embodiments, each core 15 may include a local memory (e.g., a cache memory) and further may be coupled to shared memory. Specifically, as shown in FIG. 1, a shared memory 20, which is a global shared memory, may be coupled to individual cores 15 via interconnect fabric 30. While not shown in FIG. 1 for ease of illustration, it is to be understood that processor 10 may include other components, such as input/output (I/O) interfaces, interconnects, buses, logic and the like.

Cores 15 may be selected for activation based on various algorithms. To effect such activations, interconnect fabric 30 may also be configurable so as to enable improved connectivity between activated cores 15, increasing communication speeds.

Figure 2:
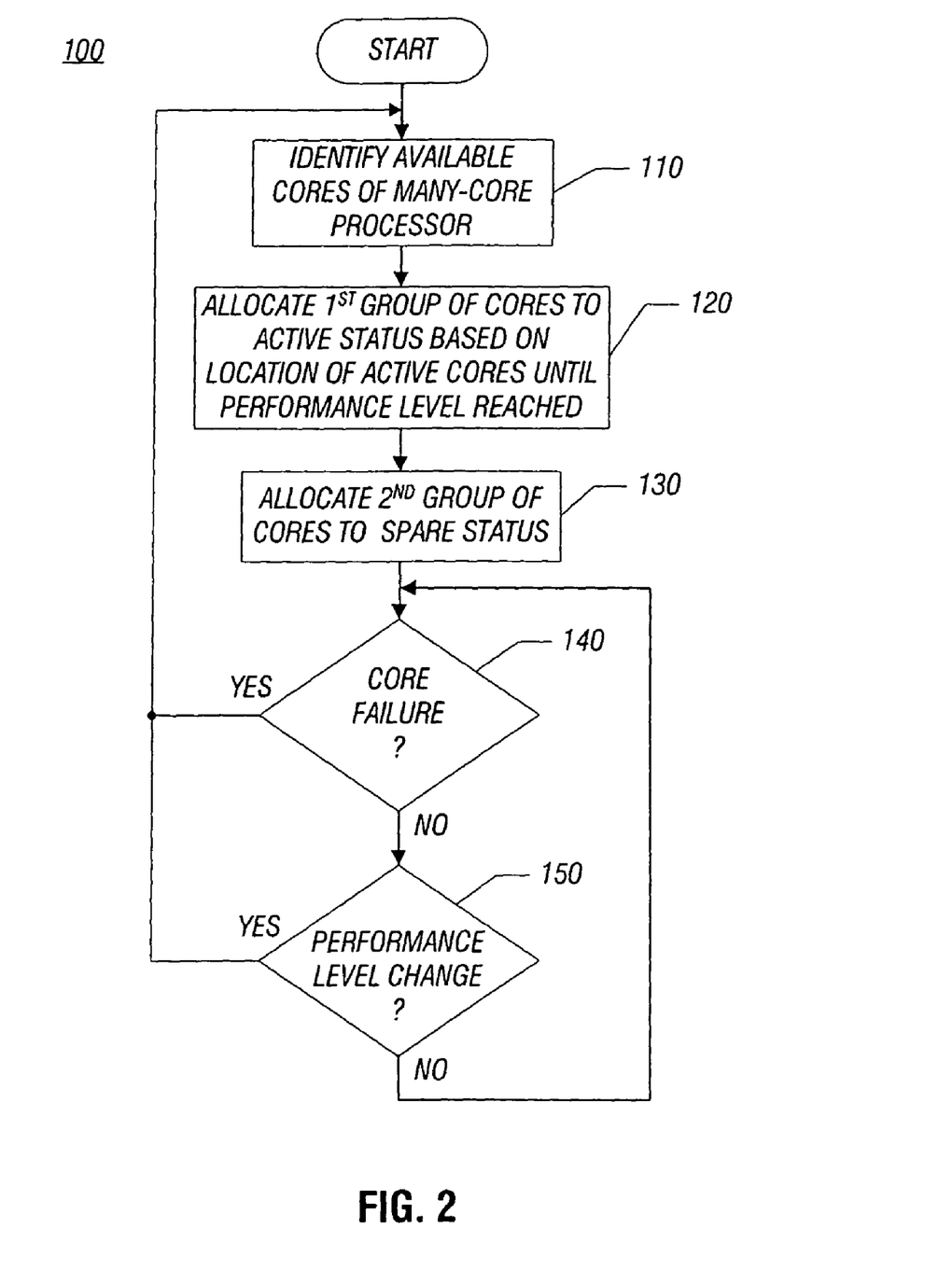
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be used to allocate cores of a many-core processor to attain a desired level of performance. In various embodiments, method 100 may be executed in a dedicated microcontroller, other logic or a core of the processor, for example. As shown in FIG. 2, method 100 may begin by identifying available cores of the many-core processor (block 110). For example, upon initialization or at other times, a polling request may be sent to all of the cores and responses may be received from those cores that are able to respond (i.e., non-failed cores).

Still referring to FIG. 2, next a first group of cores within the processor may be allocated to an active status (block 120). In some embodiments, the allocation of cores to the first group may be based on the location of a core with respect to other active cores. That is, in various embodiments an analysis of cores for enabling may consider the status of neighboring cores. In this way, cores that have a minimal number of active neighboring cores may be selected for enabling so that reduced operating temperatures can be achieved, as temperature dissipation from an active core may dissipate through either failed or spare cores near the active core. Cores of the first group may be allocated until a given performance level has been reached. Performance levels may take different forms such as instructions per second or other such measures. Note that based on the first group of cores 15 (shown in FIG. 1) activated for operation, configuration or reconfiguration of an interconnect fabric that couples the cores together may be performed. More specifically, the interconnect fabric may be selectively controlled to improve communication between the cores of the first group. In one embodiment, switches that form the interconnect fabric may be configured to connect cores of the first group in an efficient manner.

Still referring to FIG. 2, next a second group of cores may be allocated to a spare status (block 130). That is, when the desired performance level has been reached by enabling a number of cores in the first group, remaining available cores may be placed in a second group having a spare status. As will be discussed further below, such spare cores can be moved from the second group into the first group at a later time.

Referring still to FIG. 2, after allocation of available cores into the first and second groups, e.g., at initialization, normal operation of the many-core processor may proceed. During such operation, it may be determined, either at a given interval upon a polling operation or upon receipt of a signal, that a core failure has occurred (diamond 140). If so, control passes back to block 110, discussed above. Accordingly, the flow discussed above may be performed again to reallocate one or more cores in place of the failed core.

Still referring to FIG. 2, if at diamond 140 no core failure is determined, control passes to diamond 150. There it may be determined whether there is a performance level change. Two types of performance level changes may occur. One such change may be an indication, e.g., from a user for a different desired level of performance. For example, a user may desire greater performance for execution of more complex operations. A second type of performance change may indicate that the actual performance level of the many-core processor has changed, e.g., because one or more of the cores is no longer operating at its previous frequency. Thus if such a performance level change is determined at diamond 150, control passes back to block 110 for reallocation of one or more cores. If instead no such performance level change is determined at diamond 150, control passes back to diamond 140 discussed above. While described with this particular implementation in the embodiment of FIG. 2, it is to be understood that the scope of the present invention is not so limited.

While the method of FIG. 2 sets forth a general procedure for allocation and reallocation of cores, in some embodiments different algorithms may be implemented for allocation and reallocation of cores. In some embodiments both schemes may implement a similar selection of active cores using a greedy optimization approach, for example. However, in other embodiments allocation and reallocation schemes may implement different core selection methods.

Figure 3:
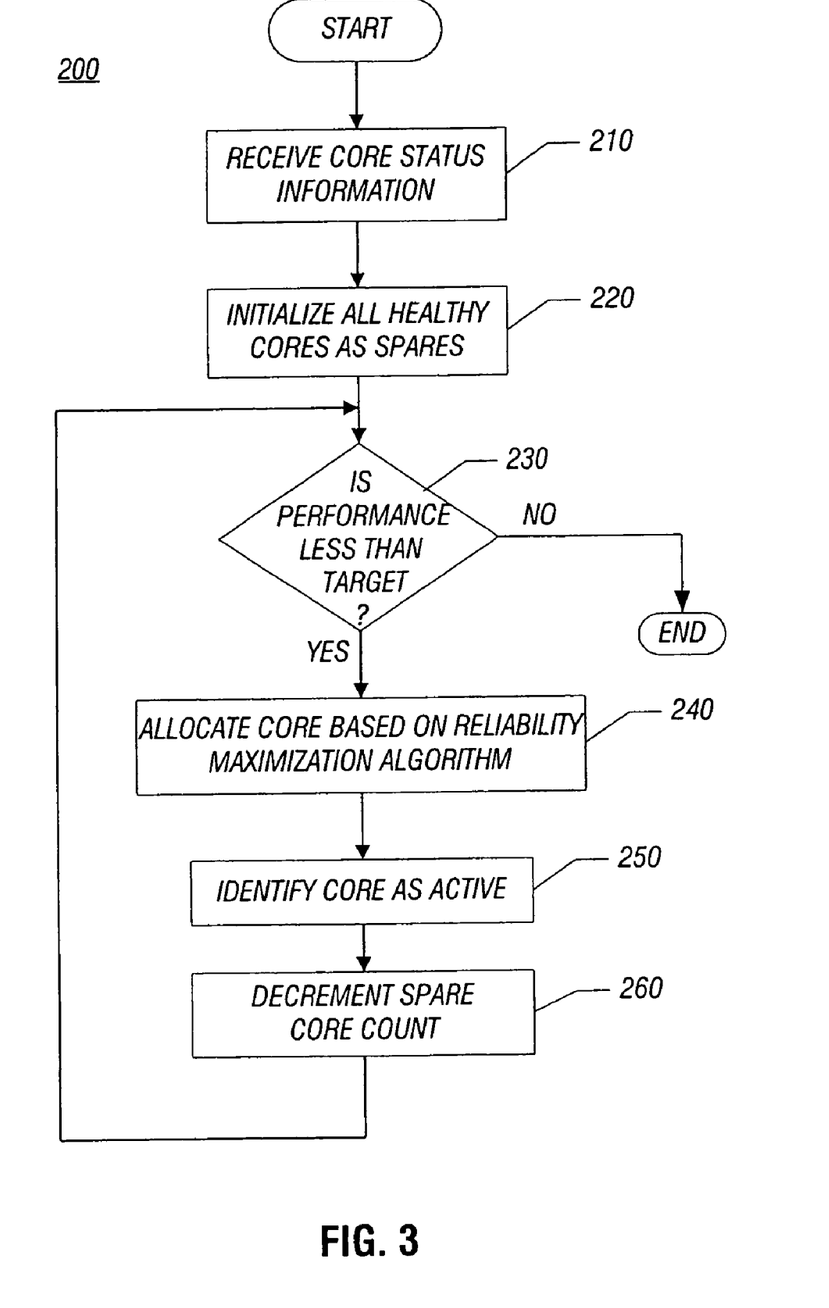
FIG. 3 is a flow diagram of a core allocation method in accordance with one embodiment of the present invention.

Referring now to FIG. 3, shown is a flow diagram of a core allocation scheme in accordance with one embodiment of the present invention. As shown in FIG. 3, method 200 may begin by receiving core status information (block 210). For example, upon powering up of a many-core processor, each core may send a signal indicating successful power up and availability for use, as well as a current maximum operating frequency. Next at block 220, all healthy cores may be initialized as spares (block 220). Thus a spare list may be maintained that initially is populated with the number of healthy cores present in the many-core processor.

Next it may be determined whether current performance is less than a target performance level (diamond 230). The performance level may correspond to a number of healthy cores desired for operation, instructions per second or another such metric. If it is determined that the performance level is not less than the target level, method 200 may conclude. Otherwise, control passes from diamond 230 to block 240. There, a core may be allocated based on a reliability maximization algorithm such as described herein (block 240). Note that upon such allocation, the interconnect fabric coupling cores together may be configured accordingly. That is, a core may be activated based on an algorithm that seeks to maximize reliability of the many-core processor. Different manners of maximizing the many-core reliability may be realized. However, in many embodiments cores may be allocated in a manner that strives to reduce overall temperature of the many-core processor or at least to reduce the operating temperature of one or more active cores of the many-core processor. As will be described further below, specific implementations of such a reliability maximization algorithm may be effected in different embodiments.

Still referring to FIG. 3, control passes from block 240 to block 250. There, the core selected may be identified as active. For example, in one embodiment a core location map that may be implemented in a bit map or other storage mechanism may have an entry corresponding to the activated core set to an active state to identify the core as active. Then control passes to block 260. There, the spare core count may be decremented (block 260). As shown in FIG. 3, from block 260 control passes back to diamond 230, discussed above.

While described with this particular implementation in the embodiment of FIG. 3, it is to be understood that the scope of the present invention is not so limited and other manners of allocating cores may be performed. In some embodiments method 200 of FIG. 3 may be performed each time the many-core processor is powered up. However, method 200 may further be implemented at various other times, such as upon processor resets or other such events.

Figure 4:
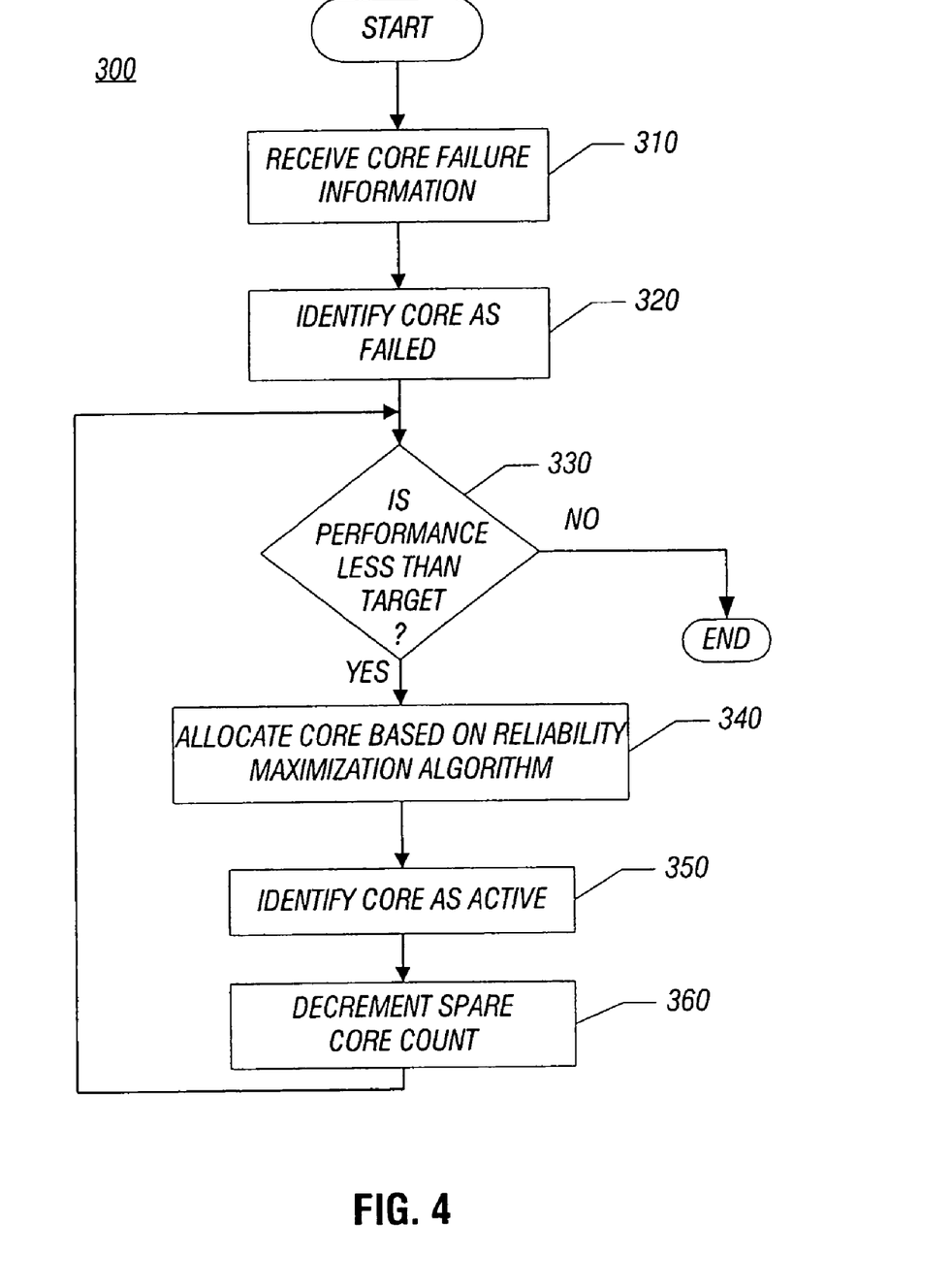
FIG. 4 is a flow diagram of a core reallocation method in accordance with one embodiment of the present invention.

Referring now to FIG. 4, shown is a flow diagram of a reallocation method in accordance with one embodiment of the present invention. As with method 200 described above with regard to FIG. 3, method 300 of FIG. 4 may be performed via a microcontroller, dedicated logic, a core of the many-core processor or in other ways.

As shown in FIG. 4, method 300 may begin by receiving core failure information (block 310). For example, a core that is about to fail may send a failure signal. Alternately, a polling method may periodically poll cores, e.g., pursuant to a watchdog timer mechanism. If a core does not respond to such polling, a failure may be indicated. Upon receipt of such failure information, the failed core may be identified as a failed core (block 320). For example, a core map e.g., a bit map or the like may be updated with the failure information.

Next, control may pass to diamond 330. There it may be determined whether the performance of the many-core processor (in light of the failure) is less than a target level (diamond 330). If not, method 300 may conclude. Otherwise, control passes from diamond 330 to block 340. There a core may be allocated based on a reliability maximization algorithm (block 340). Also, the interconnect fabric may be reconfigured accordingly. From block 340 control passes to block 350. There, the core selected may be identified as active. Then control passes to block 360, where the spare core count may be decremented (block 360). As shown in FIG. 4, from block 360 control passes back to diamond 330, discussed above.

Figure 5:
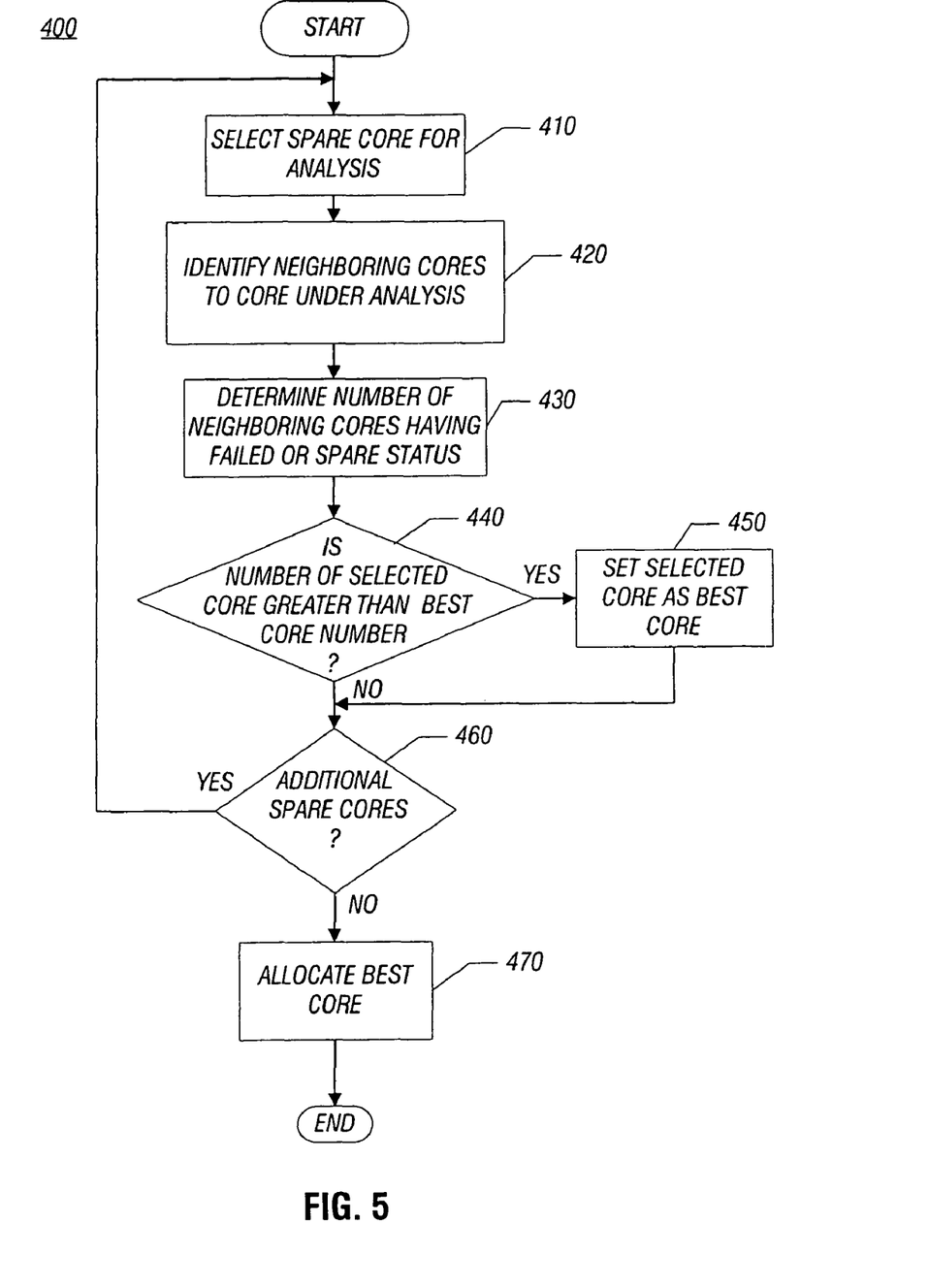
FIG. 5 is a flow diagram of a reliability maximization method in accordance with one embodiment of the present invention.

As described above, whether in an allocation mode or a reallocation mode, embodiments may implement a reliability maximization algorithm in selecting a core for activation. Referring now to FIG. 5, shown is a flow diagram of a reliability maximization method in accordance with one embodiment of the present invention. As shown in FIG. 5, method 400 may begin by selecting a spare core, e.g., of a spare core list for analysis (block 410). The analysis may begin by identifying neighboring cores to the core under analysis (block 420). Depending on a given processor layout and location of a given core, the given core may have between one and four cores neighboring it, in some embodiments. Accordingly, in block 420 these neighboring cores may be identified. Next the number of neighboring cores having a failed or spare state may be determined (block 430).

Control passes from block 430 to diamond 440. There it may be determined whether the number determined in block 430 (i.e., a neighboring number) for the selected core is greater than a current best core number (diamond 440). That is, the current neighboring number may be compared to a value of a previously analyzed core that has a highest number (of neighboring spare or failed cores). If the selected core has a greater number, control passes to block 450, where the selected core is set as the best core. Then from either block 450 or diamond 440, control passes to diamond 460. There it may be determined whether additional spare cores remain to be analyzed (diamond 460). If so, control passes back to block 410, discussed above. Otherwise, control passes to block 470. There, the best core identified may be allocated (block 470). That is, the core having the fewest number of neighboring active cores is selected. In this way, reduced temperature can be achieved for the selected core, as well as the many-core processor as a whole, as neighboring failed or spare cores may aid in heat dissipation of the selected active core. While described with this particular implementation in the embodiment of FIG. 5, it is to be understood that the scope of the present invention is not so limited.

In some embodiments, an algorithm may select which cores to activate to maximize many-core reliability while guaranteeing a target performance. A microcontroller may globally collect information on which cores have failed as well as which cores are currently in an online or spare state. In one embodiment, this information may be maintained as a bitmap on the microcontroller. In another embodiment, a failure may represent a total core failure, or the core may continue to function albeit at a degraded frequency. A degraded core may be unable to run at its initial frequency, but can run at a lower frequency, due to aging-related effects such as oxide thickness issues or NBTI effect, which causes the threshold voltage of p-channel metal-oxide semiconductor (PMOS) transistors to gradually increase over time.

As cores are allocated/reallocated, the core bitmap on the microcontroller may be updated. In different embodiments, the algorithm can be implemented in software and run as a kernel or user process on a core. Or the algorithm can be implemented in hardware (e.g., as a simple embedded core/read-only-memory (ROM) pair) and be a part of the microcontroller. In either case, the power impact of the mechanism may be minimal, since the algorithm is run relatively infrequently (e.g., upon a core failure or a substantial workload change).

In one embodiment, the algorithm has two sections, an initial core allocation section that selects which cores should be online (i.e., in an active or enabled state), and a reconfiguration section that decides on which spare core should be activated upon a core failure to maximize many-core reliability. The algorithm may further (e.g., in the reconfiguration section) handle communicating processes and assign them to cores so as to maximize performance.

Referring now to Table 1 shown is a pseudocode representation of an algorithm in accordance with one embodiment of the present invention.

TABLE 1

```
// CORE ALLOCATION
If (allocation) then
    spares=all_healthy_cores
    While (current performance < target_performance) do
Best_core=T-aware_cores(allocation)
Best_core.spare=false
spares--
    Endwhile
// CORE RECONFIGURATION
Elseif (reconfiguration)
If (corefail[Failingcore])
    Failingcore.failed=true
    While (current performance < target_performance) do
Best_core=T-aware_cores(reconfiguration)
Best_core.spare=false
spares-
        Endwhile
Elseif (processes_communicate)
Minimize_communication
Endif
Endif
T-aware_cores(mode)
// FUNCTION RETURNS BEST CORE FOR RELIABILITY
    For (K=1;K<=spares; K++)
        For (allneighborcores[K]) do
            If (neighborcore (failed) or (spare))
                neighborfree[K]++
            Endif
        Endfor
        If (neighborfree[K]>neighborfree[Bestcore])
            Bestcore=K
        Endif
    Endfor
Return(Bestcore)
Minimize_communication
    For (each communication group)
    For (each process in group)
        // ASSIGN PROCESS TO CORE THAT MINIMIZES DIAMETER
```

As shown in Table 1, the allocation portion (CORE ALLOCATION) may select cores until a preset performance target is reached. The performance target may correspond to the number of cores that are accessible by the user (e.g., based on an average selling price of the processor). Instead, the performance target may be an abstraction of the total compute power of the many-core processor, which enables consideration of process variations and core degradation. Due to these issues, some cores could be slower than others. In such an embodiment, core speeds may be reported to a microcontroller through per-core in-die variation probes (IDVP). The per-core speeds may be stored by the microcontroller for consideration in the core allocation loop.

Still referring to Table 1, the reconfiguration portion (CORE RECONFIGURATION) is activated on a core failure. One (or more) spare cores may be brought online until the target performance is reached. Note that reallocation may also consider core frequency degradation. When this is reported to the microcontroller through a core's IDVP or through predictive core mileage monitoring circuits, the core speed is updated in the microcontroller memory and degradation is considered in the core reconfiguration loop. If the current performance drops below the target performance due to degradation, more cores are brought online.

As shown in the embodiment of Table 1, both core allocation and reallocation sections use the same function T-aware_cores, a temperature-aware function that selects a spare core to be placed online. The function T-aware_cores utilizes a greedy optimization approach which selects the best spare core from the set of available spares to maximize the many-core reliability. In the embodiment of Table 1, the best core is the core that has the fewest online neighbors. In checking a candidate core's neighbors, note that failed cores are also considered since they have similar heat dissipation characteristics to spare cores. Also note that failed cores due to yield issues (if present) can also be considered as a candidate core's neighbor, thus expanding the optimization opportunities for increasing reliability of the functioning cores.

As a secondary consideration, core-to-core communication can be addressed for performance reasons. Thus, after the online cores are selected, an optional secondary optimization pass is activated if there is interprocess communication. In some implementations, an operating system (OS) may furnish this data to the microcontroller. This optimization pass (i.e., the function Minimize_communication in Table 1) can improve performance by allocating communicating processes to cores that are in close proximity to each other by using an aggressive optimization approach. Starting with an online core, it allocates the next communicating process to the closest core. This allocation may reiterate until all desired cores are online. In other embodiments, a temperature-aware algorithm may be disabled to allocate multiple cores in close proximity to each other for processes that communicate closely with each other, e.g., closely-coupled processes.

Thus allocation/reallocation mechanisms in accordance with an embodiment of the present invention can be turned on and off through OS/application control. For example, if the communication-to-computation ratio is high, the mechanisms may be turned off so that cores can be allocated in closer proximity to each other for increased performance, with reliability being a secondary goal. However, in other embodiments the mechanism may be enabled during most of the wearout phase of the many-core processor lifetime, since the core failure rates would be higher during this phase.

Figure 6:
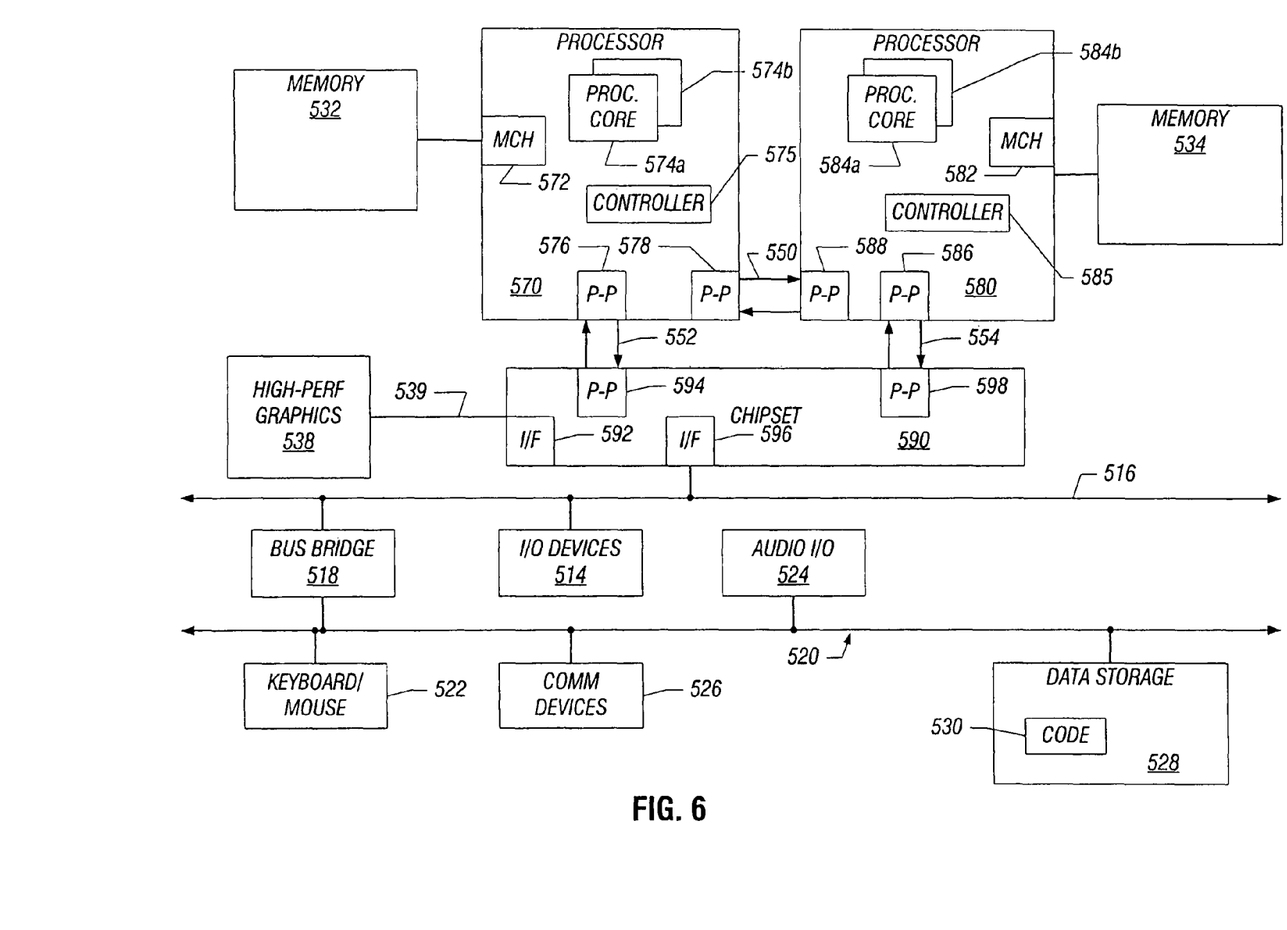
FIG. 6 is a block diagram of a multiprocessor system in accordance with an embodiment of the present invention.

Embodiments may be implemented in many different system types. Referring now to FIG. 6, shown is a block diagram of a multiprocessor system in accordance with an embodiment of the present invention. As shown in FIG. 6, the multiprocessor system is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 6, each of processors 570 and 580 may be many-core processors including first and second processor cores (i.e., processor cores 574a and 574b and processor cores 584a and 584b) although other cores and potentially many more other cores may be present in particular embodiments. Each of processors 570 and 580 may further include a controller 575 and 585, respectively which may act as an allocator to allocate cores of the many-core processor. In various implementations, controllers 575 and 585, which may be microcontrollers programmed according to an embedded ROM that includes an allocation program, may allocate cores into multiple groups based on a temperature-aware algorithm, although other implementations are possible. While not shown specifically in the embodiment of FIG. 6, controllers 575 and 585 may include memory to store a bitmap or other map information identifying the cores present in processors 570 and 580 and the status of each such core (e.g., active, spare, or failed).

Still referring to FIG. 6, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 6, MCH's 572 and 582 couple the processors to respective memories, namely a memory 532 and a memory 534, which may be portions of main memory locally attached to the respective processors. In some implementations, at least some amount of global memory may be implemented within processors 570 and 580.

In some embodiments, an operating system (OS) of the multi-processor system may execute on top of one or more of first processor 570 and second processor 580. The OS may include a scheduler to schedule processes on the different processors and cores thereof. In some implementations, controllers 575 and 585 may provide map information that includes identification of active, spare and failed cores. Using this information, the scheduler may then steer processes to/from one or the other of first processor 570 or second processor 580 or cores thereof. Furthermore, the scheduler may implement other control functions based on the allocated cores, such as core allocations to reduce distance between communicating processes. In other embodiments, such scheduling may be implemented by controllers 575 and 585 or at other locations in processors 570 and 580.

First processor 570 and second processor 580 may be coupled to a chipset 590 via P-P interconnects 552 and 554, respectively. As shown in FIG. 6, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 6, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    identifying a plurality of available cores of a many-core processor, the available cores corresponding to non-failed cores of the many-core processor;
    allocating a first subset of the plurality of available cores to an enabled state to execute processes until a performance level has been reached, and allocating a second subset of the plurality of available cores to a spare state;
    storing information regarding the allocation in a storage of the many-core processor in a bitmap included in a controller of the many-core processor, the bitmap corresponding to a layout of cores of the many-core processor, wherein the controller allocates the first and second subsets;
    receiving failure information regarding a failed core of the first subset and thereafter reallocating a core of the second subset to be a core of the first subset; and
    reallocating the core of the second subset based on identification of the core of the second subset having a fewest number of neighboring cores of the first subset.

2. The method of claim 1, further comprising allocating the first subset based on identification of cores having a fewest number of neighboring cores of the enabled state.

3. The method of claim 1, further comprising assigning a first process to a first core of the first subset and assigning a second process to a second core of the first subset based on a distance between the first core and the second core, wherein the first process and the second process communicate with each other.

4. The method of claim 1, further comprising allocating the first subset to maximize a reliability metric of the many-core processor.

5. The method of claim 4, further comprising disabling allocating the first subset to maximize the reliability metric, the disabling based on a communication-to-compute ratio of operations for the many-core processor.

6. An apparatus comprising:
a many-core processor including a plurality of cores located on a die, the many-core processor including an allocator to select, when a communication-to-compute ratio is less than a threshold, a first group of cores for active status until a performance level has been reached, and to select a second group of cores for backup status, wherein the allocator is to select the first group of cores based on their location on the die and to disable selection based on the die location when the communication-to-compute ratio is greater than the threshold.

7. The apparatus of claim 6, wherein the allocator is to select a core of the second group of cores for inclusion in the first group of cores after a failure of a core of the first group of cores.

8. The apparatus of claim 7, wherein the allocator is to identify the core of the second group of cores having a least number of neighboring cores of the first group of cores.

9. The apparatus of claim 6, wherein the allocator is to schedule a first process to a first core of the first group of cores and a second process to a second core of the first group of cores, wherein the first process and the second process communicate with each other.

10. The apparatus of claim 6, wherein the many-core processor further comprises a storage to store core status information, the core status information including location of the plurality of cores and corresponding status information; and
the allocator is to access the storage after a failure to a core of the first group of cores and to select a core of the second group of cores for reconfiguration to the first group of cores based on the core status information.

11. The apparatus of claim 6, wherein the allocator comprises a dedicated core of the many-core processor.

12. The apparatus of claim 6, wherein the allocator comprises a microcontroller including a read only memory (ROM) to store an allocation program.

13. An article comprising a machine-readable storage medium including instructions that if executed by a machine enable the machine to perform a method comprising:
receiving failure information regarding a first core of a processor; and
selecting at least one spare core of the processor having a fewest number of neighboring cores of an enabled state to enable for execution of instructions based on a temperature-aware algorithm using information stored in a bitmap of a controller of the processor, if a performance level of the processor is less than a target performance level of the processor, and reconfiguring an interconnect fabric of the processor responsive to the selection.

14. The article of claim 13, wherein selecting the at least one spare core further comprises selecting multiple cores until the target performance level of the processor is reached.

15. The article of claim 14, wherein the method further comprises receiving core operating parameter information and using the core operating parameter information to select the multiple cores until the target performance level is reached, the core operating parameter information comprising a time dependent maximum operating frequency.

16. The article of claim 13, wherein the method further comprises assigning a first process to a first core of an enabled subset of cores and assigning a second process to a second core of the enabled subset of cores based on a distance between the first core and the second core, wherein the first process and the second process communicate with each other.

17. A system comprising:
a many-core processor including a plurality of cores coupled via an interconnect fabric, the many-core processor including a controller to allocate a first subset of cores for operation and a second subset of cores as spares, and to store core status information including location of the plurality of cores and corresponding activation status information in a bitmap of the controller, wherein the controller is to first allocate the first subset of cores via a first function based on an activation status of neighboring cores with respect to the first subset of cores and to second allocate processes that communicate to ones of the first subset of cores via a second function, and to disable allocation via the first function when a communication-to-compute ratio is greater than a threshold; and
a dynamic random access memory (DRAM) coupled to the many-core processor.

18. The system of claim 17, wherein the controller is to select the core of the second subset of cores having a least number of neighboring cores of the first subset of cores for inclusion in the first subset of cores upon a failure to one of the first subset of cores.

19. The system of claim 17, wherein the controller is to schedule a first process to a first core of the first subset of cores and a second process to a second core of the first subset of cores according to a temperature-aware algorithm in a first mode of operation, and not according to the temperature-aware algorithm in a second mode of operation.

20. The system of claim 17, wherein the interconnect fabric is reconfigurable based on allocation of the first subset of cores.

21. The system of claim 17, wherein the controller includes a read only memory (ROM) including an allocation program.

22. The method of claim 1, wherein the performance level is a total compute power of the many-core processor, and further comprising analyzing process variation and core degradation in allocating the first subset of the plurality of available cores.

23. The method of claim 22, further comprising receiving core degradation information in the controller and storing the core degradation information in the storage.

24. The method of claim 23, further comprising receiving the core degradation information from an in-die variation probe.

* * * * *